United States Patent
Mazaika

(10) Patent No.: US 6,708,894 B2
(45) Date of Patent: Mar. 23, 2004

(54) METHOD FOR INVISIBLE EMBEDDED DATA USING YELLOW GLYPHS

(75) Inventor: Paul K. Mazaika, Palo Alto, CA (US)

(73) Assignee: Xerox Corporation, Saitama, CT (US)

( * ) Notice: Subject to any disclaimer, the term of this patent is extended or adjusted under 35 U.S.C. 154(b) by 86 days.

(21) Appl. No.: 09/888,511

(22) Filed: Jun. 26, 2001

(65) Prior Publication Data

US 2002/0195501 A1 Dec. 26, 2002

(51) Int. Cl.[7] .............................................. G06K 19/06
(52) U.S. Cl. ....................... 235/494; 235/456; 235/487; 235/375
(58) Field of Search ................... 235/375, 456, 235/487, 494, 468, 469

(56) References Cited

U.S. PATENT DOCUMENTS

| | | |
|---|---|---|
| 5,221,833 A | 6/1993 | Hecht |
| 5,245,165 A | 9/1993 | Zhang |
| 5,315,098 A | 5/1994 | Tow |
| 5,486,686 A | 1/1996 | Zdybel et al. |
| 5,491,760 A | 2/1996 | Withgott et al. |
| 5,696,594 A | 12/1997 | Saito et al. |
| 6,000,613 A * | 12/1999 | Hecht et al. ................. 235/456 |
| 6,076,738 A * | 6/2000 | Bloomberg et al. .......... 235/456 |
| 6,254,007 B1 * | 7/2001 | Mowry, Jr. .................. 235/487 |

FOREIGN PATENT DOCUMENTS

EP   0 590 884 B1   6/1998

* cited by examiner

*Primary Examiner*—Karl D. Frech
*Assistant Examiner*—Daniel A. Hess

(57) ABSTRACT

The present invention provides a system and method for encoding digital data in a hardcopy rendering of an invisible image of circularly asymmetric dot patterns. The dot patterns are slash-like markings or glyphs tilted to the right and left with respect to the longitudinal axis of the recording medium. The glyphs are written onto a spatially periodic, two dimensional array of cell blocks to encode information without modulating the average reflectances of the cell blocks. In operation the dot patterns are written onto the recording medium in yellow at approximately a 2% pixel density to produce an image that is invisible to the naked eye, but capable of being reliably decoded by conventional machinery.

3 Claims, 5 Drawing Sheets

METHOD FOR INVISIBLE EMBEDDED DATA USING YELLOW GLYPHS

RELATED APPLICATIONS

The following applications are relied upon and hereby incorporated by reference in this application:

U.S. Pat. No. 5,486,686 to Zdybel et al., entitled, "Hardcopy Lossless Data Storage and Communications for Electronic Document Processing Systems";

U.S. Pat. No. 5,491,760 to Withgott et al., entitled, "Method and Apparatus for Summarizing a Document with Document Image Decoding."

TECHNICAL FIELD

The present invention is directed to systems and methods for embedding information into an image and more particularly to systems and methods for embedding invisible information into an image and reliably decoding the information at a later time.

BACKGROUND

The technique of embedding encoded information into paper documents using data glyph technology has been widely practiced for the last 20 years. It is particularly advantageous for use in document applications that require a high density rate of embedded data and require the embedded data to be robust for decoding purposes. However, data glyph encoding produces perceptible image changes which may detract from the overall image quality of a document.

Data glyph technology encodes digital information in the form of binary 1's and 0's that are then rendered in the form of distinguishable shaped marks such as very small linear marks. Generally, each small mark represents a digit of binary data; whether the particular digit is a digital 1 or 0 depends on the linear orientation of the particular mark. For example, in one embodiment, marks that are oriented from top left to bottom right may represent a "0," while marks oriented from bottom left to top right may represent a "1". The individual marks are of such a small size relative to the maximum resolution of a black and white printing device so as to produce an overall visual effect to a casual observer of a uniformly gray halftone area when a large number of such marks are printed together in a black and white image on paper. When incorporated in an image border or graphic, this uniformly gray halftone area does not explicitly suggest that embedded data is present in the document. However, a viewer of the image could easily detect that the small dots forming the gray halftone area are a series of small marks that together bear binary information.

History has shown that the closely spaced glyphs forming the gray halftone area are often processed incorrectly by descreening algorithms utilized by fax machines, copiers and scanners. More specifically, during a typical copy or scan operation, some descreening algorithms attempt to provide some enhancement of an image by smoothing and averaging data within image regions. Similarly, during a typical fax operation, the resolution of the fax machine will smooth and average data. Since prior art glyphs are so close together, the descreening process results in the inadvertent erasure of some glyphs.

Examples of U.S. Patents on data glyph technology are U.S. Pat. Nos. 5,221,833, 5,245,165, and 5,315,098. U.S. Pat. No. 5,221,833, entitled "Methods and Means for Reducing Error Rates in Reading Self-Clocking Glyph Codes", discloses a method for encoding n-bit long multi-bit digital values in a pre-ordered cyclical sequence based on their analytically or empirically determined probabilities of being confused with each other, such that each glyph is adjacent in that sequence to the two glyphs with which it is more likely to be confused during decoding. U.S. Pat. No. 5,245,165, entitled "Self-Clocking Glyph Code for Encoding Dual Bit Digital Values Robustly", discloses a method for encoding dual bit digital values in the cardinal rotations (0°, 90°, 180° and 270°) of a logically ordered sequence of wedge-shaped glyphs (essentially right triangles) that are written, printed or otherwise recorded on a hardcopy recording medium with a predetermined spatial formatting rule. The widths of the glyphs vary unidirectionally as a function of their height, so they can be decoded reliably, even when they are degraded by scan errors, dropped scan lines and/or random noise patterns.

A system and method for encoding digital data in halftone images is disclosed in U.S. Pat. No. 5,315,098 to Tow, entitled "Methods and Means for Embedding Machine Readable Digital Data in Halftone Images," the disclosure of which is incorporated herein by reference in its entirety. In Tow, digital data are encoded in the angular orientation of circularly asymmetric halftone dot patterns that are written into the halftone cells of digital halftone images. The sizes of the halftone dot patterns are modulated in accordance with grayscale data sample values that are provided to define the image. The patterns are modulated so that the average reflectance or transmittance of each of the halftone cells is modulated to provide a more or less standard halftone rendering of the image. By modulating the angular orientation of the halftone dot patterns, digital data is encoded within the halftone image. The digital data can then be scanned into a computer, decoded and later processed. However, the close spatial relationship between adjacent halftone dot patterns may complicate the process of discriminating between logical states. Tow therefore set aside crosshatched pixels to function as dedicated background pixels to simplify the task of discriminating between their different angular orientations. Unfortunately that also resulted in visible graininess and degradation of image quality. Accordingly, there is a need for a less obtrusive code that is reliably decoded without affecting image quality.

In the prior art, the modulation of the angular orientation of the halftone dot patterns may disadvantageously affect the quality of the image because even with a low pixel density (e.g., 2%), the halftone images still detract from the appearance of the overall image because they have visible graininess to the naked eye. In addition, usual processing by fax, scan, or copy operations will cause the inadvertent erasure of digital information embedded in halftone images.

Consequently, none of the above references provide a system and method for embedding invisible information into a document and reliably decoding the information at a later time.

Thus, there is a need to overcome these and other problems of the prior art and to provide an efficient method for embedding invisible information into an image and reliably decoding the information at a later time. The present invention, as illustrated in the following description, is directed to solving one or more of the problems set forth above.

SUMMARY OF THE INVENTION

In accordance with the present invention, a method is disclosed for encoding digital data in a hardcopy rendering of an invisible image defined by at least one circularly asymmetric dot pattern. The method comprises the steps of modulating the dot pattern in accordance with the digital data; and rendering the modulated dot pattern into a tiled halftone cell of predetermined color, size and pixel density on a recording medium, thereby producing a hardcopy rendering of the invisible image with the digital data encoded thereon.

In accordance with one embodiment of the present invention, the size of the cell is a 12×12 matrix.

In accordance with another embodiment of the present invention, the color of the dot pattern is yellow.

In yet another embodiment, the predetermined pixel density is 2%.

DETAILED DESCRIPTION

Figure 1:
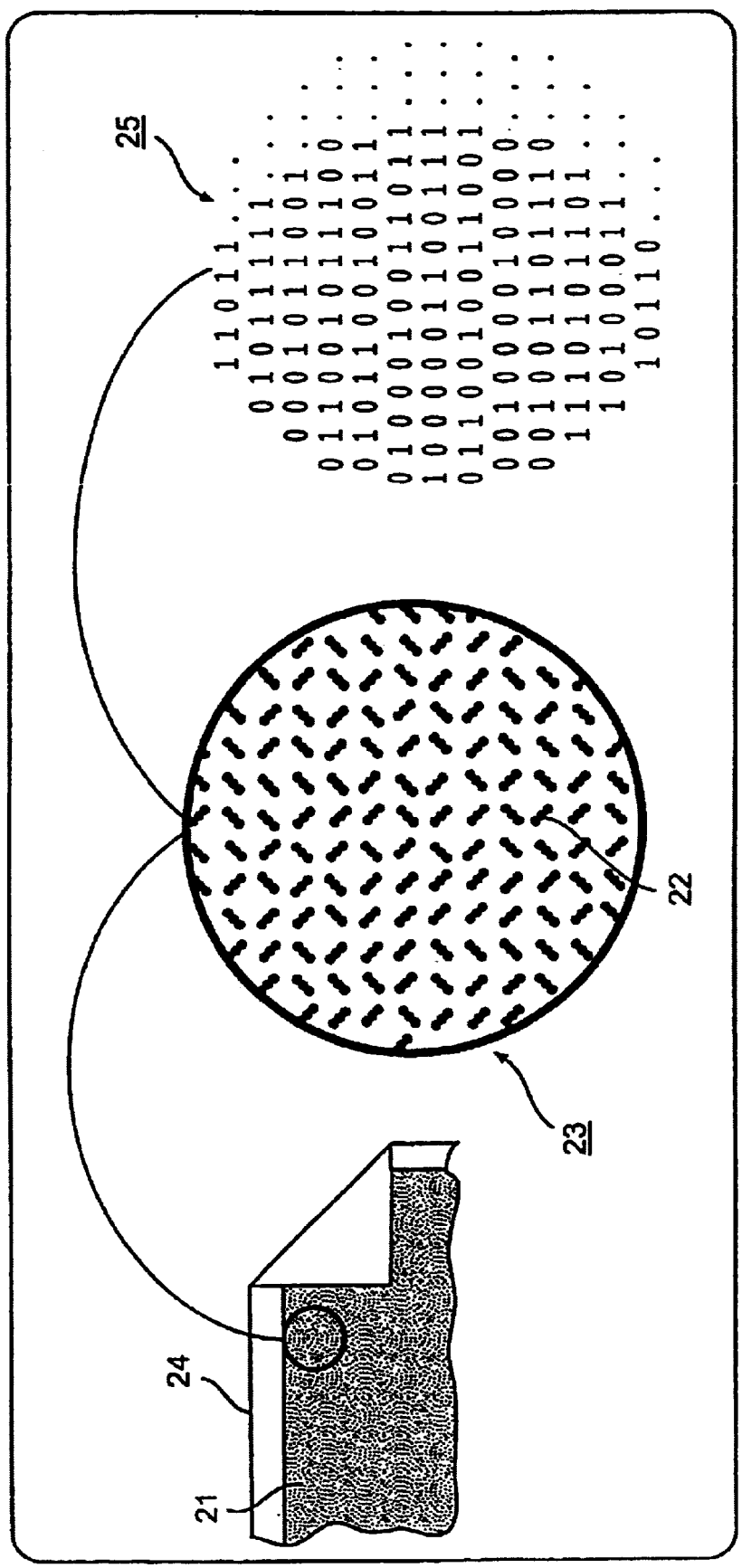
FIG. 1, illustrates an embedded data pattern which is composed, as shown by the magnified fragment and the corresponding interpretation, of a glyph code pattern for encoding machine readable binary information.

In the following detailed description, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that algorithmic changes may be made without departing from the scope of the present invention. The following detailed description is, therefore, not to be taken in a limited sense.

Turning first to the nomenclature of the specification, the detailed description which follows is represented largely in terms of processes and symbolic representations of operations performed by conventional computer components, including a central processing unit (CPU), memory storage devices for the CPU, and connected pixel-oriented display devices. These operations include the manipulation of data bits by the CPU, and the maintenance of these bits within data structures that reside in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc., which are often associated with manual operations performed by a human operator. It must be understood that no such involvement of a human operator is necessary or even desirable in the present invention. The operations described herein are machine operations performed in conjunction with a human operator or user who interacts with the computer. The machines used for performing the operation of the present invention include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

The operating environment in which the present invention is used encompasses general distributed computing systems wherein general purpose computers, work stations, or personal computers are connected via communication links of various types. In a client server arrangement, programs and data, many in the form of objects, are made available by various members of the system.

Turning now to the drawings, and at this point especially to FIG. 1, there is a rectangular self-clocking glyph code pattern 21 which is printed on a suitable recording medium 24, such as an ordinary plain paper document. For example, as most clearly shown by the magnified portion 23 of the glyph code 21, the code suitably is composed of slash-like markings or "glyphs" 22 which are tilted to the right and left with respect to the longitudinal axis of the recording medium 24 at approximately +45° and −45° to encode "0"s" and "1's", respectively, as indicated at 25. Each code value is represented by the presence of a glyph, so no data is encoded in the spaces between the glyphs 22 or in the transitions that define their edges. Consequently, the glyphs 22 suitably are printed on more or less uniform centers, thereby giving the glyph code 21 a generally homogeneous visual appearance. Indeed, the scale on which the glyph code 21 is printed often is sufficiently small to cause the individual glyphs 22 to essentially blend together when viewed by the unaided eye under normal viewing conditions. This is an important advantage, especially for applications that require or benefit from being able to embed machine readable digital data in images in a visually unobtrusive or aesthetically pleasing way. However, the modulation of the angular orientation of the halftone dot patterns may disadvantageously affect the tone of the image because even with a low pixel density (e.g., 2%), the halftone images still may detract from the appearance of the overall image because they are visible to the naked eye.

Figure 2:
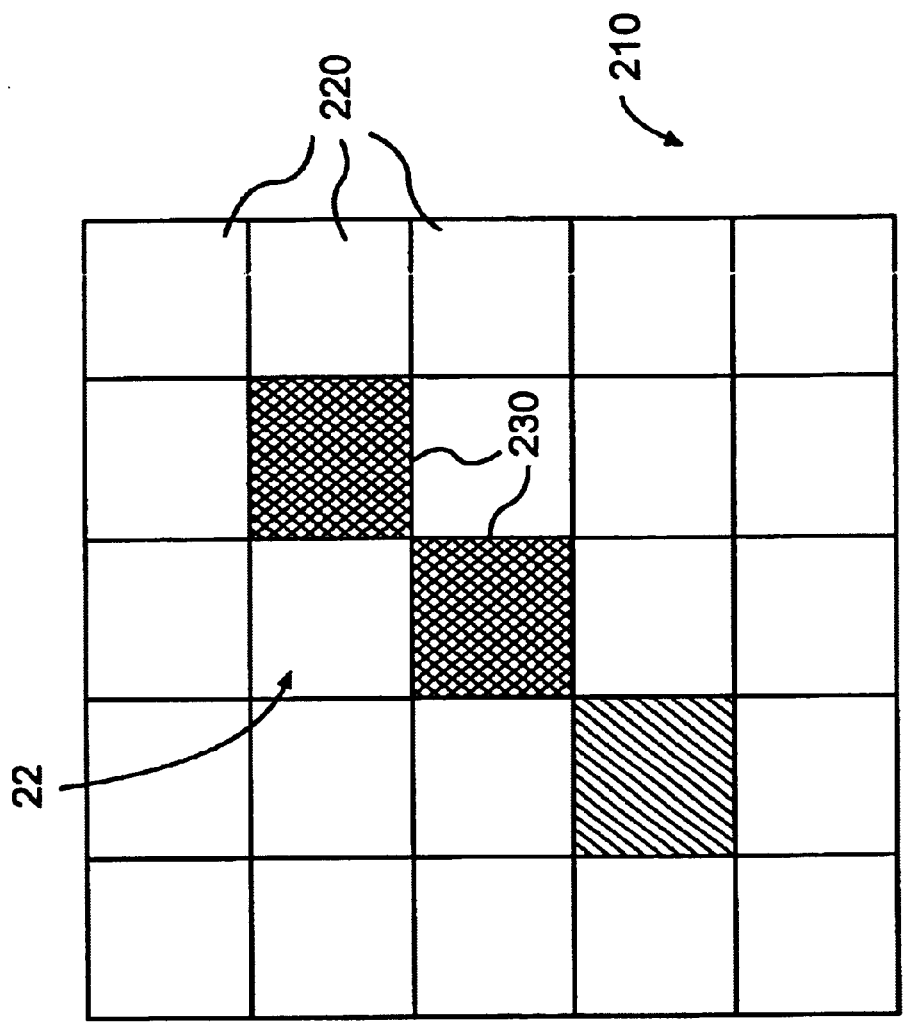
FIG. 2 is a prior art diagram of a halftone cell that illustrates a suitable fill order for generating circularly asymmetric halftone dot patterns.

As is known by those skilled in the art, glyphs 22 are actually comprised of a plurality of pixels. Referring to FIG. 2, it is shown that glyphs are written into a spatially periodic, two dimensional array of cell blocks to give a uniform aesthetically pleasing appearance for a large number of glyphs. As shown in FIG. 2, glyph 22 is written into a prior art cell block 210 composed of a 5×5 array of pixels 220. Dot patterns, such as the hatched pattern shown in FIG. 2, are written into the cell blocks by selectively altering the logical state of certain of their pixels, so that those pixels logically convey the information contained in the digital data. For example, the pixels that define a dot pattern may be set to a logical true ("1") state if the inputted digital data specifies ("1"). On the other hand, a dot pattern may be set to a logical false ("0") state if the inputted digital data specifies ("0"). Focusing in some additional detail on FIG. 2, it will be seen that some of the pixels 230 of the halftone cell 210 are crosshatched. Crosshatched pixels 230 are set aside to function as dedicated background pixels for all of the halftone dot patterns. This has been done to maintain the circular asymmetry of the dot patterns and to simplify the task of discriminating between their different permissible angular orientations. Of course, the cost of providing these dedicated background pixels is that the grayscale resolution of the halftone cell 210 is slightly reduced (i.e., from a theoretical limit of twenty-six different grayscale levels to an actual limit of twenty-four levels in the illustrated case), and one extreme (say, the "black" extreme) of the grayscale range is slightly truncated. However, the human eye has limited high frequency resolution and limited grayscale acuity, so the truncation of the grayscale range and the reduced grayscale resolution may fall below the perceptual threshold of casual observers who view the halftone images that are produced at a normal viewing distance under normal illumination conditions. In any event, glyphs 22 appear to be a uniformly gray halftone image. If the gray blocks are printed in another color (e.g., yellow), the block will still be visible as a yellow block because the average yellow density is too high to render the glyphs invisible. In effect, glyphs 22 cannot be constructed with fewer than three pixels, given dedicated background pixels 230, and regardless of the color of the pixels, the glyphs are generally perceptible when rendered on an image. Consequently, it is not possible to construct invisible glyphs that can also be reliably decoded, using the prior art halftone cell 210.

Figure 3:
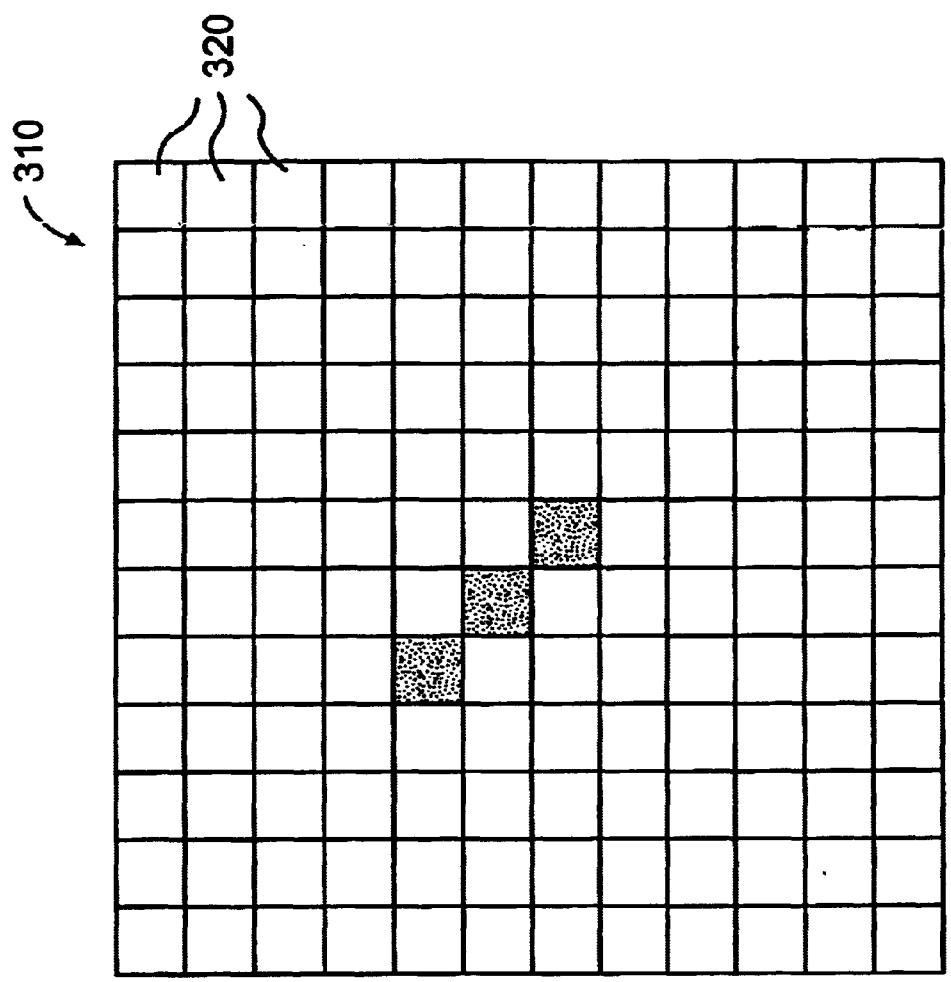
FIG. 3 is a diagram of a cell block that illustrates a suitable fill order for generating circularly asymmetric dot patterns in accordance with one embodiment of the present invention.

FIG. 3 illustrates a cell block 310 in accordance with one embodiment of the present invention. As shown in FIG. 3, cell block 310 is comprised of a two dimensional array of pixels 320. While not specifically shown, it is intended that halftone cell 210 and cell block 310 are similarly sized, such that pixel 320 is less than ½ the size of pixel 220. Since the size of the pixels are smaller, dot patterns printed using pixels from cell block 310 are much less perceptible than similarly-sized patterns using pixels from cell 210. Moreover, when yellow glyph marks using cell block 310 are printed on a white background at a density of approximately 2%, the pixels are not visible to the naked eye. For example, if each glyph consists of 3 yellow pixels at ±45°, and each glyph is inside a plain box of size 12×12 pixels, the entire glyph block will remain below 2% average yellow, and thus be non-visible to the naked eye. Each yellow glyph is however detectable on a standard quality color scanner (e.g., 400 or 600 s.p.i.) In fact, each glyph mark is about the size of a comma in 2-pt font, and is therefore detectable by any copier that has good image quality.

Figure 4:
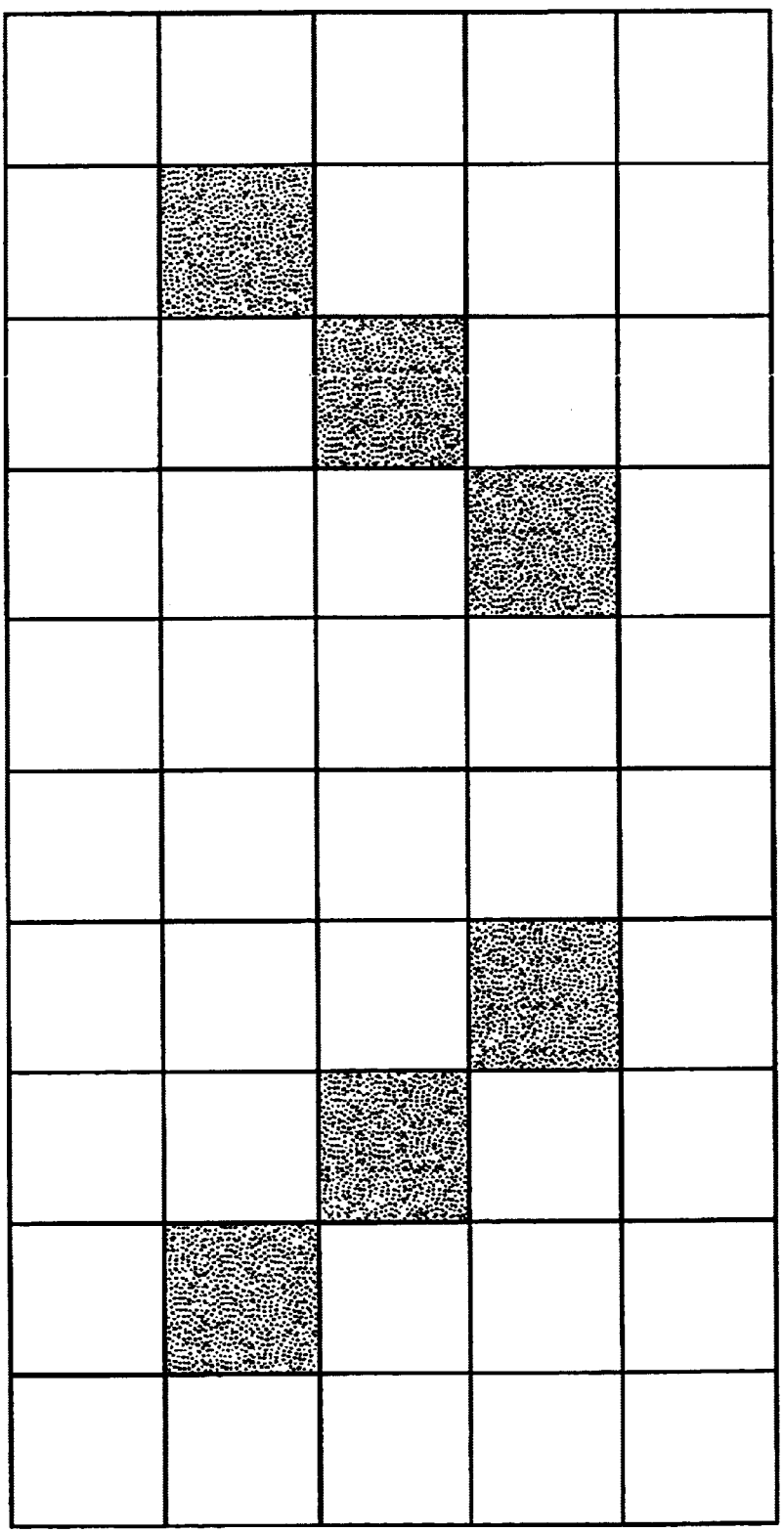
FIG. 4 is a diagram of two prior art cell blocks, side-by-side.

Referring now to FIG. 4, it is shown that when two glyphs in accordance with the prior art are printed side-by-side, they are separated by about 2 pixels. Because they are printed so close together, they achieve a visually uniform gray or yellow color. The closely spaced glyphs are so similar to halftones that they will be erased on many copiers as part of the descreen/rescreen process.

Figure 5:
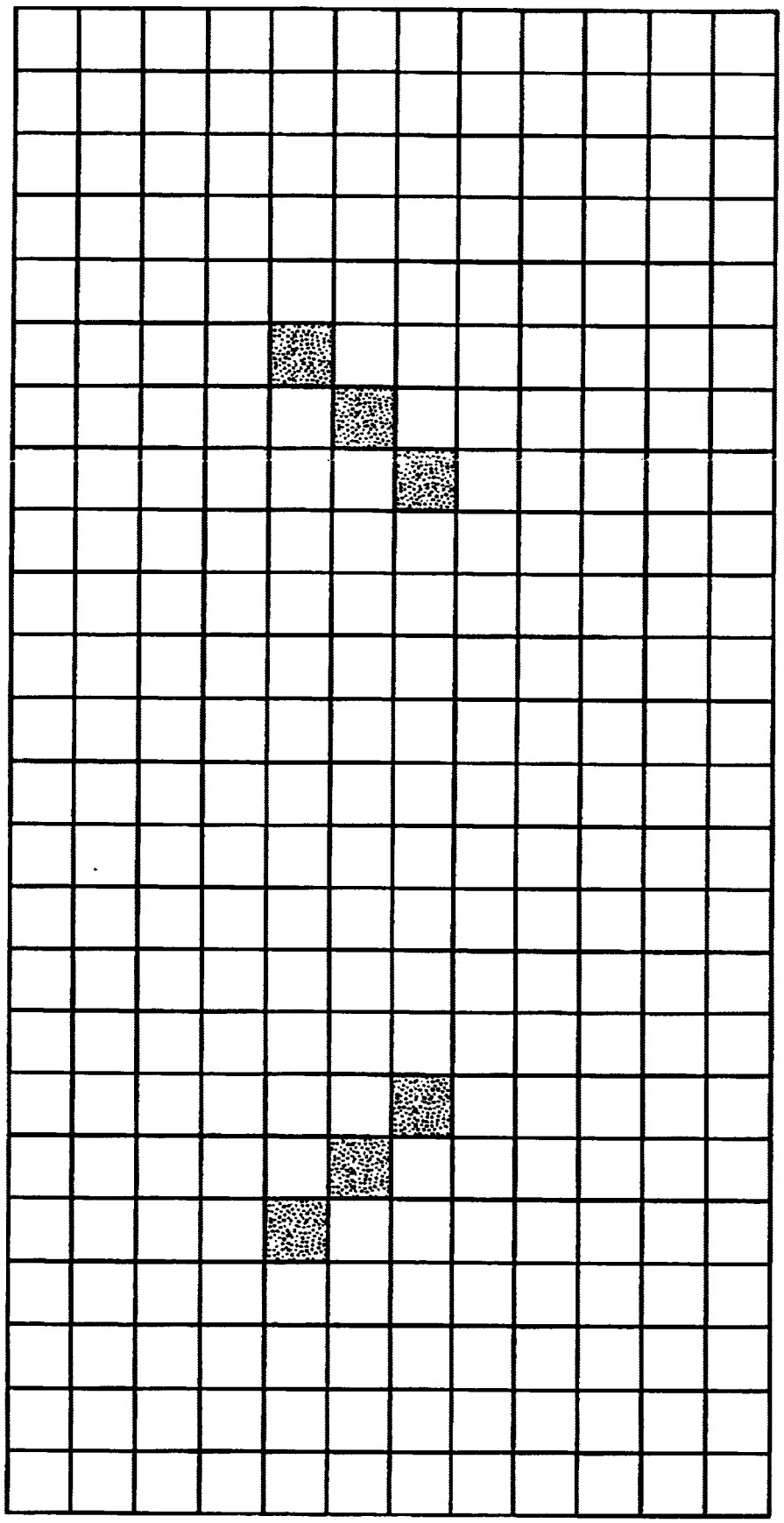
FIG. 5 is a diagram of two side-by-side cell blocks in accordance with one embodiment of the present invention.

Referring to FIG. 5, it is shown that in the present invention, side-by-side glyphs are separated by about 9 pixels of space and are relatively sparse compared to prior art glyphs. Because they are sparse, they are not incorrectly processed as halftone screens by copy processing algorithms.

Despite the fact that the yellow glyphs are small, glyph mark detection can be performed easily without complex Optical Character Recognition (OCR) algorithms. For example, matched filter detection can be applied using 3×3 or 5×5 filters, which is within the filter size commonly used in digital copiers to reduce, enlarge, sharpen, or smooth an image.

From the foregoing description, it will be appreciated that the present invention provides an efficient system and method for embedding invisible information into an image and reliably decoding the information at a later time. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Although aspects of the present invention are described as being stored in memory, one skilled in the art will appreciate that these aspects can also be stored on or read from other types of computer-readable media, such as secondary storage devices, like hard disks, floppy disks, or CD-ROMs; a carrier wave from the Internet; or other forms of RAM or ROM. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and, therefore, no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for encoding digital data in a hardcopy rendering of an invisible image defined by at least one circularly asymmetric dot pattern, said method comprising:
   modulating said dot pattern in accordance with said digital data; and
   rendering said modulated dot pattern into a tiled halftone cell of predetermined visible color and size on a recording medium, thereby producing said hardcopy rendering of the invisible image with said digital data encoded thereon, wherein each dot pattern occupies 2% of a matrix.

2. The method of claim 1, wherein the predetermined visible color is yellow.

3. The method of claim 1, wherein the predetermined size is a 12×12 matrix.

* * * * *